(12) United States Patent
Evans et al.

(10) Patent No.: US 7,200,680 B2
(45) Date of Patent: Apr. 3, 2007

(54) METHOD, APPARATUS AND SYSTEM FOR PROVIDING MULTIMEDIA MESSAGES TO INCOMPATIBLE TERMINALS

(75) Inventors: John P. Evans, Levittown, NY (US); David Oren, Melville, NY (US); Karl Schwarz, Valley Stream, NY (US); Peter L. Squillante, Northport, NY (US)

(73) Assignee: Ericsson Inc., Plano, TX (US)

( * ) Notice: Subject to any disclaimer, the term of this patent is extended or adjusted under 35 U.S.C. 154(b) by 545 days.

(21) Appl. No.: 10/095,321

(22) Filed: Mar. 11, 2002

(65) Prior Publication Data

US 2003/0172121 A1 Sep. 11, 2003

(51) Int. Cl.
*G06F 15/16* (2006.01)
(52) U.S. Cl. .................. 709/246; 709/206; 709/219
(58) Field of Classification Search ........... 709/206, 709/246; 455/466
See application file for complete search history.

(56) References Cited

U.S. PATENT DOCUMENTS

| | | | | |
|---|---|---|---|---|
| 5,623,538 | A | | 4/1997 | Petty .......................... 379/67 |
| 5,630,060 | A | * | 5/1997 | Tang et al. .................. 709/238 |
| 5,635,918 | A | * | 6/1997 | Tett ............................ 340/7.29 |
| 5,764,735 | A | | 6/1998 | Thorner .................... 379/93.07 |
| 6,009,462 | A | * | 12/1999 | Birrell et al. ................ 709/206 |
| 6,212,550 | B1 | * | 4/2001 | Segur ......................... 709/206 |
| 6,333,919 | B2 | * | 12/2001 | Gaffney ...................... 370/254 |
| 6,389,276 | B1 | * | 5/2002 | Brilla et al. ................ 455/413 |
| 6,411,990 | B1 | * | 6/2002 | Shaffer et al. .............. 709/206 |
| 6,463,292 | B1 | * | 10/2002 | Rahman ..................... 455/466 |
| 6,718,168 | B2 | * | 4/2004 | Ala-Luukko et al. ..... 455/412.1 |
| 6,738,803 | B1 | * | 5/2004 | Dodrill et al. .............. 709/218 |
| 6,754,710 | B1 | * | 6/2004 | McAlear ..................... 709/227 |
| 6,771,949 | B1 | * | 8/2004 | Corliss ....................... 455/413 |
| 6,795,711 | B1 | * | 9/2004 | Sivula ........................ 455/466 |

(Continued)

FOREIGN PATENT DOCUMENTS

EP 1 091 601 A 4/2001

(Continued)

OTHER PUBLICATIONS

"Universal Mobile Telecommunications System (UMTS);Multimedia Messaging Service (MMS), Functional description;Stage 2 (3GPP TS 23.140 version 4.2.0 Release 4)" ETSI TS 123 140 V4.2.0, XX, XX Mar. 2001, XP002180514 paragraph 05.2.

*Primary Examiner*—Andrew Caldwell
*Assistant Examiner*—Douglas Blair (57) ABSTRACT

The present invention provides a method, apparatus and system for providing multimedia messages to incompatible terminals. The apparatus includes a notification module (216), a media converter (220) and a retrieval module (218). The notification module (216) notifies the incompatible terminal (210) that the multimedia message (222) is available. The media converter (220) transcodes one or more parts of the multimedia message (222). The retrieval module (218) is communicably coupled to the media converter (220) and retrieves the multimedia message (222) in response to a delivery request (232, 234) from the incompatible terminal (210), renders the multimedia message (222), using the media converter (220) as necessary, into a message that is compatible with the incompatible terminal (210) and sends the message to the incompatible terminal (210). This method can be implemented using a computer program embodied on a computer readable medium wherein each function is executed using a code segment.

6 Claims, 7 Drawing Sheets

U.S. PATENT DOCUMENTS

| | | | |
|---|---|---|---|
| 6,826,597 B1 * | 11/2004 | Lonnroth et al. | 709/207 |
| 6,889,246 B1 * | 5/2005 | Kawamoto et al. | 709/204 |
| 7,024,459 B2 * | 4/2006 | McNamara et al. | 709/206 |
| 7,130,650 B2 * | 10/2006 | Noldus | 455/466 |
| 2001/0012302 A1 | 8/2001 | Gaffney | |
| 2002/0006803 A1 | 1/2002 | Mendiola et al. | |
| 2002/0091783 A1 * | 7/2002 | Garland et al. | 709/207 |
| 2002/0112081 A1 * | 8/2002 | Armstrong et al. | 709/246 |
| 2002/0120697 A1 * | 8/2002 | Generous et al. | 709/206 |
| 2005/0207379 A1 * | 9/2005 | Shen et al. | 370/338 |

FOREIGN PATENT DOCUMENTS

| | | | |
|---|---|---|---|
| EP | 1091607 A2 * | 4/2001 | |
| EP | 1091601 A * | 11/2001 | |
| KR | 2001002568 | 4/2001 | |
| WO | WO 99/56431 | 11/1999 | |
| WO | WO 00/64110 * | 10/2000 | |
| WO | WO 00 64110 A | 10/2000 | |
| WO | WO 01/33781 A1 | 5/2001 | |
| WO | WO 01 33782 A | 5/2001 | |
| WO | WO 01/33782 A1 | 5/2001 | |
| WO | WO 01/35689 A1 | 5/2001 | |
| WO | WO 2001/33782 A * | 5/2001 | |

* cited by examiner

METHOD, APPARATUS AND SYSTEM FOR PROVIDING MULTIMEDIA MESSAGES TO INCOMPATIBLE TERMINALS

TECHNICAL FIELD OF THE INVENTION

The present invention relates generally to the field of communications and, more particularly, to a method, apparatus and system for providing multimedia messages to incompatible terminals.

BACKGROUND OF THE INVENTION

Multimedia consists of one or more media elements, such as text, voice, image and video, and it is the combination of these media elements in an ordered synchronized manner that creates a multimedia presentation, which is also referred to as multimedia content. A non-real time multimedia message as observed by the user is a combination of one or more different media elements in a multimedia presentation that can be transferred between users without having to be transferred in real time.

With the popularity of the Internet and increased capability of personal computers, multimedia technology has and continues to rapidly develop to allow new capabilities, such as multimedia messages, games, presentations and services that are now considered to be a part of every day life. Moreover, the reduced size and increased capabilities of handheld devices, such as personal data assistants ("PDAs"), mobile phones and combinations thereof, have made the delivery of multimedia content to such devices more of a possibility. Most of the user terminals currently in use are not, however, compatible with multimedia messages. As a result, a network that allows the transmission of multimedia messages will have to find a way to determine whether a user's device is capable of receiving multimedia messages and then deal with the multimedia message in some way. Despite the public's desire for multimedia compatible devices, this problem is likely to continue for quite some time, especially when considering the network operator's desire to have a network that is compatible with existing and previously deployed incompatible terminals.

There is, therefore, a need for a method, apparatus and system that provides multimedia messages to incompatible terminals and is capable of supporting current and future multimedia messaging services, and exploits the advances being made in the world multimedia community, with additional mobile requirements.

SUMMARY OF THE INVENTION

The present invention provides a flexible architecture that supports present and future multimedia messaging technologies and processes multimedia messages to allow them to be delivered to any user regardless of the type or capabilities of the user's terminal. As a result, the sender of the multimedia message does not have to be aware of the receiving user's terminal capability. Likewise, the multimedia service does not have to be aware of the receiving user's terminal capability. Moreover, the present invention allows a user having an incompatible terminal to access multimedia messages through conventional WAP and web services. The present invention, therefore, allows all users, regardless of terminal type, to access multimedia messages without modifying the multimedia service center, the message gateway or the user's terminal. This results in lower costs and system complexity because a multimedia client proxy between the multimedia service center and the message gateway provides the multimedia message to the incompatible terminal.

The present invention provides a method for providing a multimedia message to an incompatible terminal. The present invention receives a notification that the multimedia message is available for delivery to the incompatible terminal, notifies the incompatible terminal that the multimedia message is available and requests that retrieval of the multimedia message be deferred in the multimedia service center. The present invention then receives a request for delivery of the multimedia message from the incompatible terminal, retrieves the multimedia message, renders the multimedia message into a message that is compatible with the incompatible terminal and sends the message to the incompatible terminal. This method can be implemented using a computer program embodied on a computer readable medium wherein each function is executed using a code segment.

The present invention also provides an apparatus for providing a multimedia message to an incompatible terminal that includes a notification module, a media converter and a retrieval module. The notification module notifies the incompatible terminal that the multimedia message is available. The media converter transcodes one or more parts of the multimedia message. The retrieval module is communicably coupled to the media converter and retrieves the multimedia message in response to a delivery request from the incompatible terminal, renders the multimedia message, using the media converter as necessary, into a message that is compatible with the incompatible terminal and sends the message to the incompatible terminal.

In addition, the present invention provides a system for providing a multimedia message to an incompatible terminal that includes a multimedia service center, a message gateway for communicating with the incompatible terminal and a multimedia client proxy communicably coupled to the multimedia service center and the message gateway. The multimedia client proxy notifies the incompatible terminal that the multimedia message is available via the message gateway, retrieves the multimedia message from the multimedia service center in response to a delivery request from the incompatible terminal via the message gateway, renders the multimedia message into a message that is compatible with the incompatible terminal and delivers the message to the incompatible terminal via the message gateway.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. For example, in addition to telecommunications systems, the present invention may be applicable to other forms of communications or general data processing. Other forms of communications may include communications between networks, communications via satellite, or any form of communications not yet known to man as of the date of the present invention. The specific embodiments discussed herein are merely illustrative of specific ways to make and use the invention and do not limit the scope of the invention.

The present invention provides a flexible architecture that supports present and future multimedia messaging technologies and processes multimedia messages to allow them to be delivered to any user regardless of the type or capabilities of the user's terminal. As a result, the sender of the multimedia message does not have to be aware of the receiving user's terminal capability. Likewise, the multimedia service does not have to be aware of the receiving user's terminal capability. Moreover, the present invention allows a user having an incompatible terminal to access multimedia messages through conventional WAP and web services. The present invention, therefore, allows all users, regardless of terminal type, to access multimedia messages without modifying the multimedia service center, the message gateway or the user's terminal. This results in lower costs and system complexity because a multimedia client proxy between the multimedia service center and the message gateway provides the multimedia message to the incompatible terminal.

Figure 1:
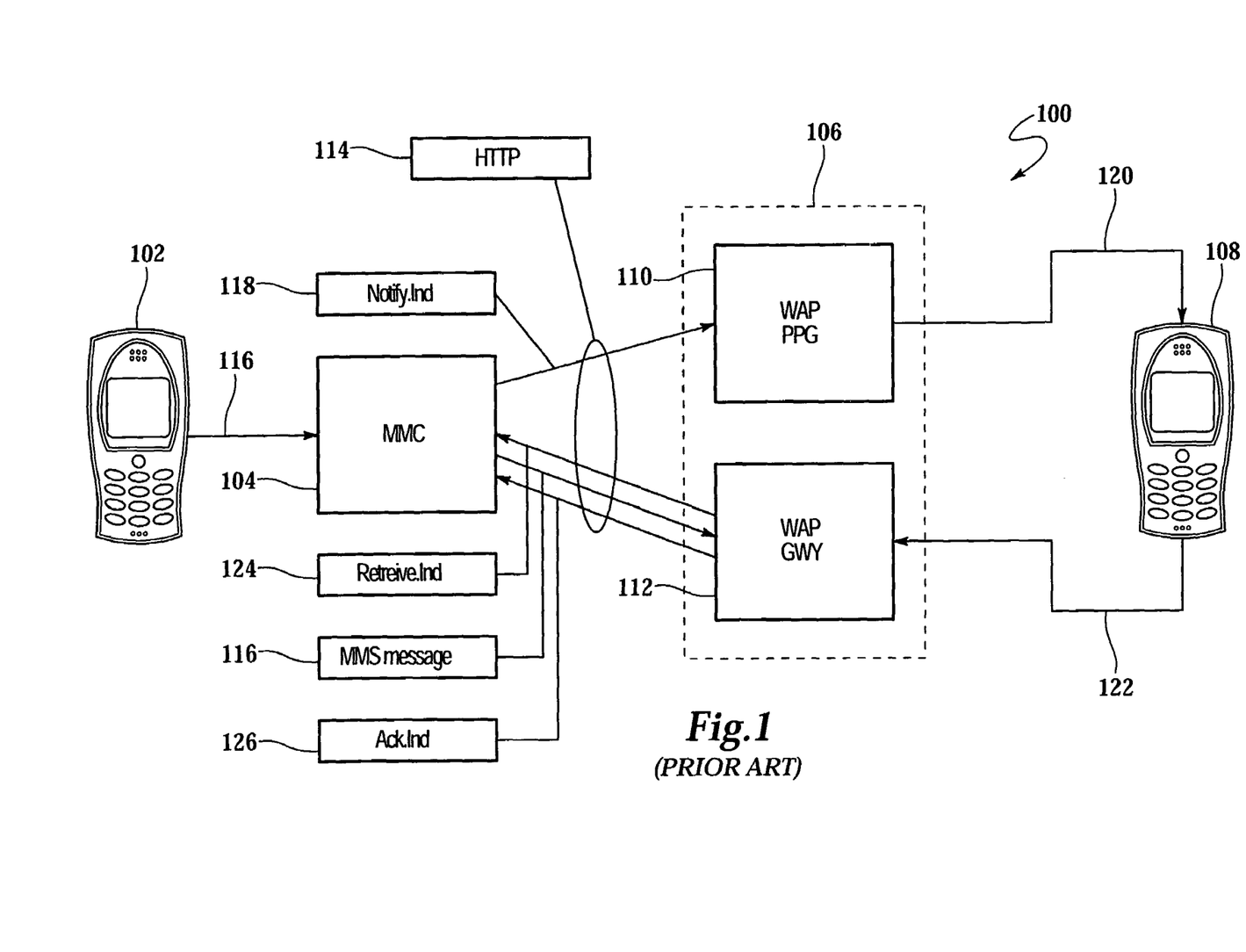
FIG. 1 is a block diagram illustrating a multimedia message processing system in accordance with the prior art.

Now referring briefly to and discussing the prior art in reference to FIG. 1, a block diagram illustrating a multimedia message processing system 100 in accordance with the prior art is shown. The system 100 includes a sending user's terminal 102, a multimedia service center ("MMC") 104, a message gateway 106 and a receiving user's terminal 108. The sending and receiving user's terminals 102 and 108 are both multimedia compatible. In addition, the sending and receiving user's terminals 102 and 108 are communicably connected to the multimedia service center 104 and message gateway 106, respectively, via one or more communication networks, such as fixed networks, mobile networks, Global System for Mobile Communications ("GSM") second generation ("2G") mobile networks, third generation ("3G") mobile networks and Internet/IP networks. The MMC 104 is responsible for storage and handling of incoming and outgoing multimedia messages and for the transfer of multimedia messages between different messaging systems. The message gateway 106 is responsible for notifying the receiving user's terminal 108 that a multimedia message is ready for delivery and subsequently handles the delivery of the multimedia message to the receiving user's terminal 108. The message gateway 106 may include a WAP/Push Proxy Gateway ("WAP PPG") 110 and a WAP gateway 112. The MMC 104 is communicably connected to the message gateway 106 via a network that uses standard Internet-type protocols 114, such as Hypertext Transfer Protocol ("HTTP").

In operation, the sending user's terminal 102 sends the multimedia message 116 to the MMC 104 where it is stored pending delivery to the receiving user's terminal 108. The MMC 104 sends a notification 118 (Notify.Ind) to the WAP PPG 110, which in turn sends a notification 120 to the receiving user's terminal 108 indicating that the multimedia message 116 has been received and is ready for delivery. When the user wants to receive the multimedia message 116, he or she sends a retrieve message 122 from the receiving user's terminal 108 to the WAP gateway 112, which sends a retrieval request 124 (Retrieve.Ind) to the MMC 104. The MMC 104 sends the multimedia message 116 to the WAP gateway 112, which forwards the multimedia message 116 to the receiving user's terminal 108 and sends an acknowledgment 126 (Ack.Ind) back to the MMC 104 indicating that the multimedia message 116 has been received.

Figure 2:
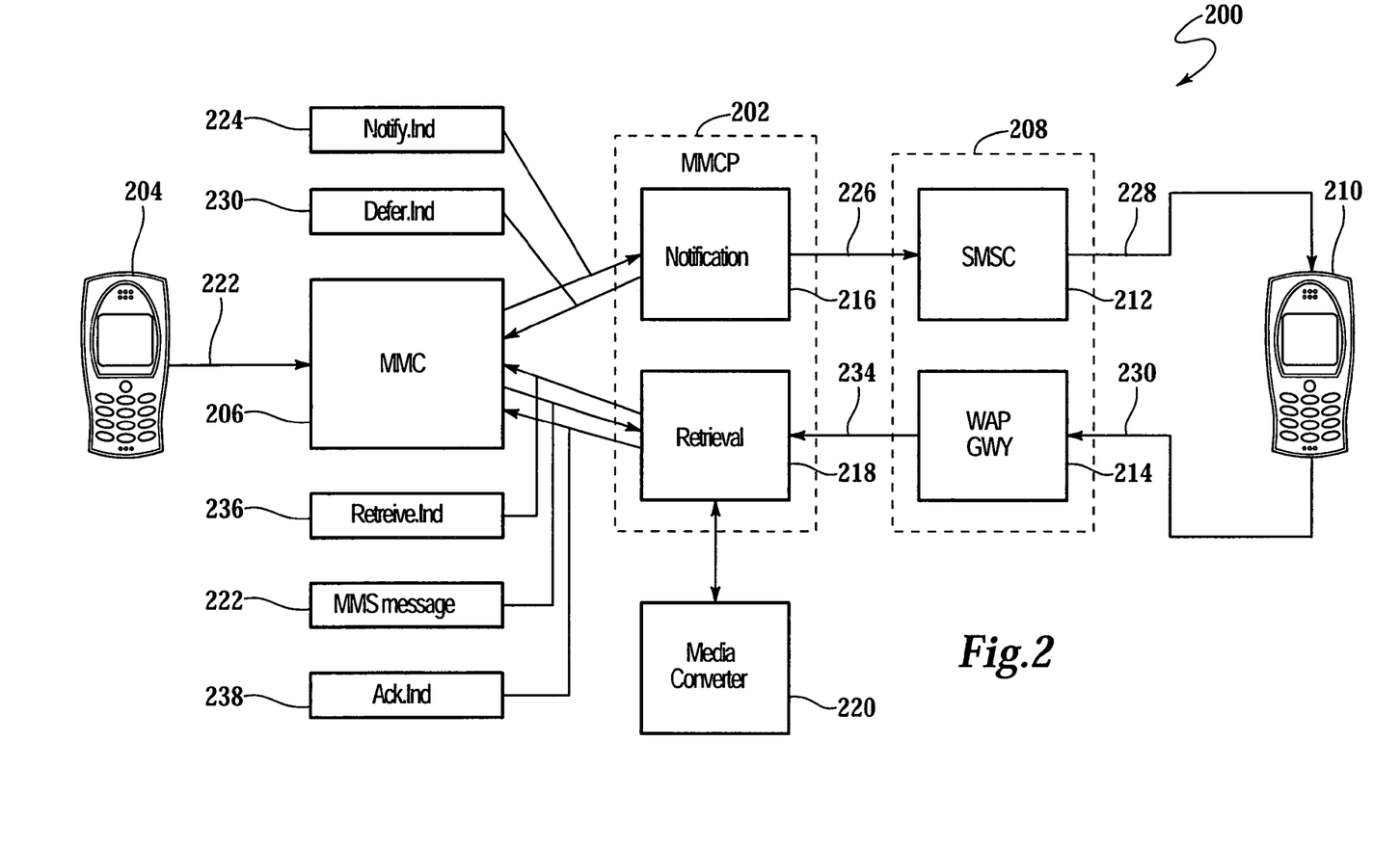
FIG. 2 is a block diagram illustrating a multimedia message processing system using a multimedia client proxy in accordance with one embodiment of the present invention.

Now turning back to the discussion of the present invention in reference to FIG. 2, a block diagram illustrating a multimedia message processing system 200 using a multimedia client proxy ("MMCP") 202 in accordance with one embodiment of the present invention is shown. The system 200 includes a sending user's terminal 204, a multimedia service center ("MMC") 206, a MMCP 202, a message gateway 208 and a receiving user's terminal 210. The sending user's terminal 204 is multimedia compatible, whereas the receiving user's terminal 210 is incompatible with multimedia messages, such as a WAP terminal. In addition, the sending and receiving user's terminals 204 and 210 are communicably connected to the MMC 206 and message gateway 208, respectively, via one or more communication networks, such as fixed networks, mobile networks, 2G mobile networks, 3G mobile networks and Internet/IP networks. The message gateway 208 includes a Short Messaging Service server ("SMSC") 212 and a WAP gateway 214. The MMC 206, MMCP 202 and message gateway 208 are communicably connected together via networks that use standard Internet-type protocols, such as HTTP, XML, SMTP and others. The present invention also uses standard mobile telecommunication protocols, such as SMS, MMS and others. The MMCP 202 includes a notification module 216 and a retrieval module 218. The MMCP 202 is also communicably connected to a media converter 220.

In operation, the sending user's terminal 204 sends the multimedia message 222 to the MMC 206 where it is stored pending delivery to the receiving user's terminal 210. The MMC 206 sends a notification 224 (Notify.Ind) to the notification module 216 of the MMCP 202, which in turn sends a notification 226 to the SMSC 212, which sends a notification 228 to the receiving user's terminal 210 indicating that the multimedia message 222 has been received and is ready for delivery. The MMCP 202 also sends a request that the retrieval of the multimedia message be deferred 230 (Defer.Ind) to the MMC 206. When the user wants to receive the multimedia message 222, he or she sends a retrieve message 232 from the receiving user's terminal 210 to the WAP gateway 214, which sends a retrieval request 234 to the retrieval module 218 of the MMCP 202. The retrieval module 218 of the MMCP 202 sends a retrieval request 236 (Retrieve.Ind) to the MMC 206, which then sends the multimedia message 222 to the retrieval module 218 of the MMCP 202. The retrieval module 218 of the MMCP 202 renders the multimedia message 222 into a message that is compatible with the incompatible terminal (receiving user's terminal 210). If necessary, the media converter 220 is used to transcode one or more parts of the multimedia message 222 (e.g., JPEG to WBMP). The rendered message is then sent to the incompatible terminal (receiving user's terminal 210) via the message gateway 208. The retrieval module 218 of the MMCP 202 also sends an acknowledgment 238 (Ack.Ind) back to the MMC 206 indicating that the multimedia message 116 has been received.

Figure 3A:
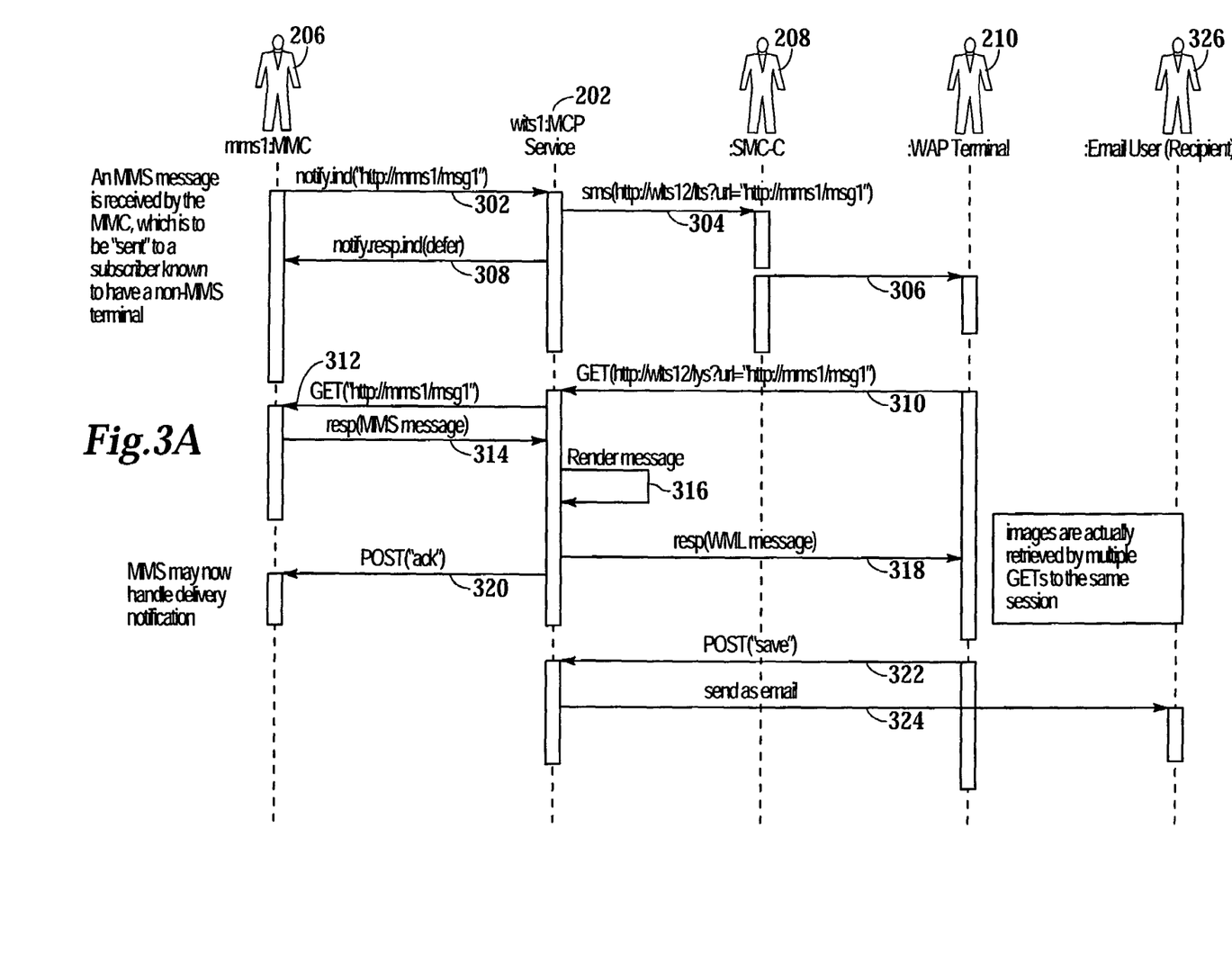
FIG. 3A is a sequence diagram illustrating multimedia message processing using a multimedia client proxy in accordance with one embodiment of the present invention.

Referring now to FIG. 3A, a sequence diagram illustrating multimedia message processing using a multimedia client proxy in accordance with one embodiment of the present invention is shown. This sequence allows a user with a WAP or HTML browser to retrieve a multimedia message from the MMC 206. In general, the MMCP 202 receives an HTTP GET request from the user's terminal browser requesting a multimedia message stored in the MMC 206. The MMCP 202 extracts the URL of the multimedia message stored in the MMC 206 from the HTTP GET request and sends a HTTP GET containing the URL of the multimedia message to the MMC 206. The MMCP 202 will receive a M-Retrieve.conf message from the MMC 206 in the HTTP response body of the HTTP GET and will decode all relevant multimedia message header fields in the M-Retrieve as well as the MMS body. The MMCP 202 will determine the type of browser (and terminal 210) used by the user and will render the multimedia message body using the applicable markup language (WML or HTML). The MMCP 202 then send a HTTP POST containing a formatted M-Acknowledge.ind message to the MMCP 202.

More specifically, the sequence starts after the MMC 206 (mms1: MMC) receive the multimedia message destined for a subscriber or user that is known to have a non-MMS or incompatible terminal 210 (: WAP Terminal). The MMCP 202 (wlts1: MCP Service) receives a notification 302 (notify.ind(http://mms1/msg1)) from the MMC 206 that the multimedia message is available for delivery to the incompatible terminal 210. The MMCP 202 notifies (messages 304 and 306 (sms(http://wlts12/lts?url="http://mms1/msg1")) the incompatible terminal 210 that the multimedia message is available via the message gateway 208 (: SMS-C). The MMCP 202 then requests (message 308 (notifyresp.ind (defer)) the MMC 206 to defer retrieval of the multimedia message.

At some time later, the MMCP 202 receives a request 310 (GET(http://wlts12/lts?url="http://mms1/msg1")) for delivery of the multimedia message from the incompatible terminal 210. The MMCP 202 then retrieves the multimedia message by sending a request message 312 (GET(http://mms1/msg1)) to the MMC 206 and receiving the multimedia message from the MMC 206 in a response message 314 (resp(MMS message)). The MMCP 202 then renders 316 the multimedia message into a message that is compatible with the incompatible terminal 210, as will be further described in reference to FIG. 3B. The MMCP 202 then sends the compatible or rendered message to the incompatible terminal in message 318 (resp(WML message)). Images are actually retrieved by multiple GETs to the same session. The MMCP 202 the sends an acknowledgement 320 (POST ("ack")) to the MMC 206, which can then handle delivery notification to the sending user.

In addition, the user is offered the possibility of forwarding the retrieved message to a user specified electronic mail destination. The receiving user requests that the multimedia message be saved by sending a save request 322 (POST ("save")) containing an electronic mail address 326 (: Email User (Recipient)) from the incompatible terminal 210 to the MMCP 202. The MMCP 202 will format SMTP electronic mail message with MIME encoded multimedia body to the address specified by the user. The MMCP 202 to sends the multimedia message to the electronic mail address 326 as electronic mail 324.

Figure 3B:
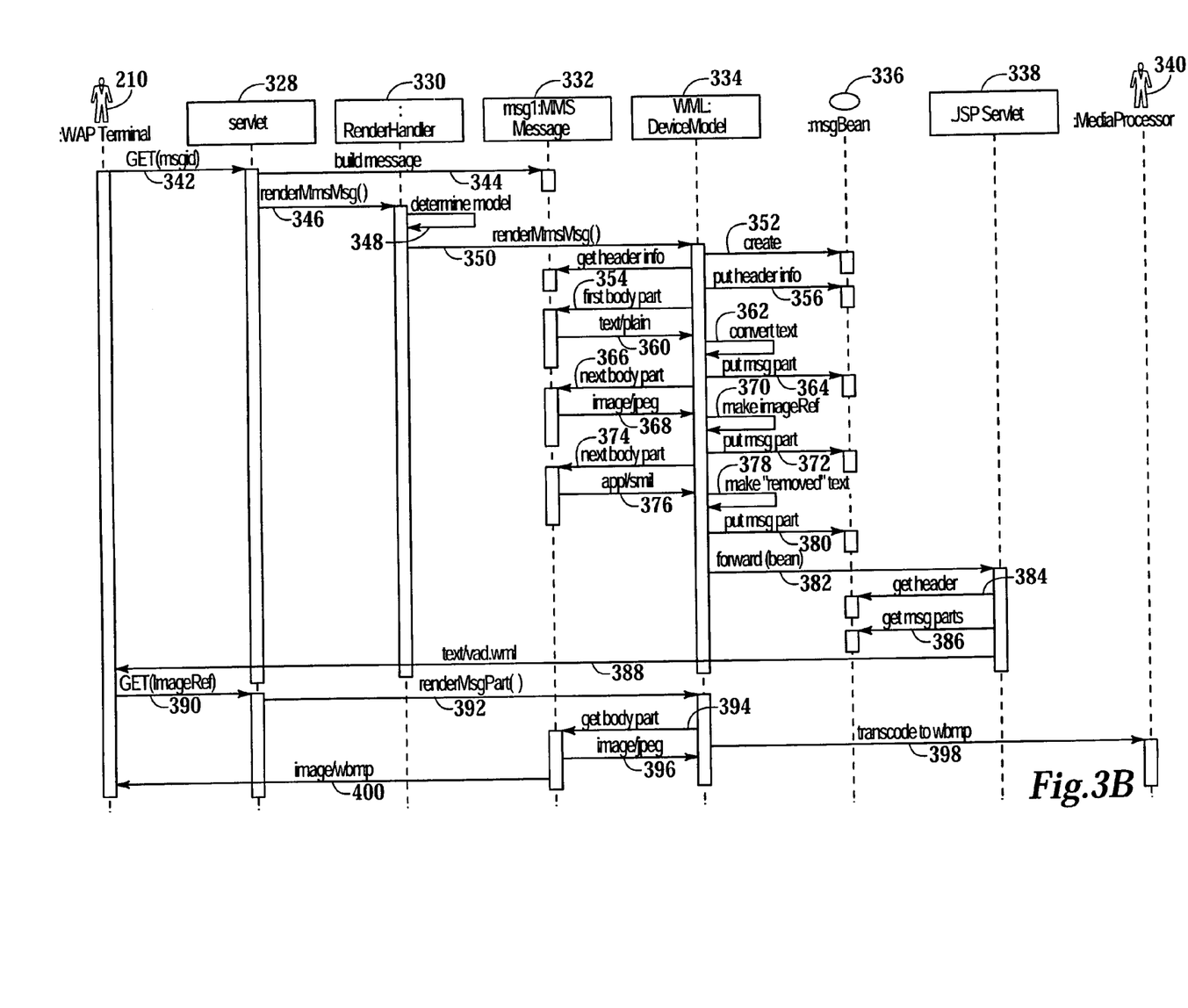
FIG. 3B is a sequence diagram illustrating a rendering sequence during the multimedia message process of FIG. 3A.

Now referring to FIG. 3B, a sequence diagram illustrating a rendering sequence 316 during the multimedia message process of FIG. 3A is shown. In general, the rendering sequence 316 includes the steps of determining a model for use in rendering the multimedia message, getting a header from the multimedia message, putting the header in the message, and getting each body part from the multimedia message, converting the body part to a format that is compatible with the incompatible terminal and putting the converted body part in the message. The multimedia message will be rendered with all parts that the browser/target device supports. Some parts, such as a picture, may be converted to a format compatible with the browser. Message parts that cannot be rendered will be noted to the user.

More specifically, the incompatible terminal 210 (: WAP Terminal) requests delivery of the multimedia message via message 342 (GET(msgid)) from servlet 328, which sends a build message 344 to msg1: MMS Message 332 and sends a rendering request 346 to : RenderHandler 330. The RenderHandler 330 determines the model to be used to render the multimedia message in step 348, which is described below in more detail reference to FIG. 3C. Thereafter, the RenderHandler 330 sends message 350 (renderMmsMsg( )) to the WML : DeviceModel 334 to render the multimedia message using the model. WML : DeviceModel 334 sends a create message 352 to the : msgBean 336 and get header request 354 (getheaderinfo) to msg1: MMS Message 332. WML : DeviceModel 334 sends a get request 358 for the first body part to msg1: MMS Message 332, receives text/plain 360 from msg1: MMS Message 332 and converts the text using the model in step 362. WML : DeviceModel 334 sends the rendered message part 364 (putmsgpart) to the : msgBean 336. WML : DeviceModel 334 sends a get request 366 for the next body part to msg1: MMS Message 332, receives image/jpeg 368 from msg1: MMS Message 332 and makes an image reference using the model in step 370. WML DeviceModel 334 sends the rendered message part 372 (putmsgpart) to the : msgBean 336. WML : DeviceModel 334 sends a get request 374 for the next body part to msg1: MMS Message 332, receives appl/smil 376 from msg1: MMS Message 332 and makes a "removed text" area using the model in step 378. WML : DeviceModel 334 sends the rendered message part 380 (putmsgpart) to the : msgBean 336. This process is repeated until all parts of the multimedia message are rendered. The bean is then forwarded to the : JSP Servlet 338 in message 382 (forward (bean)). The : JSP Servlet 338 gets the header and message parts from the : msgBean 336 via messages 384 and 386, respectively. The : JSP Servlet 338 then sends the message to the : WAP Terminal 210 via message 388 (text/vad.wml).

The : WAP Terminal 210 receives the images within the message via one or more get requests 390 (GET(ImageRef)) to the servlet 328. Upon receiving such a get request 390, the servlet 328 sends a render request 392 (renderMsgPart( )) to the WML : DeviceModel 334, which sends a get request 394 for the body part to msg1: MMS Message 332, receives image/jpeg 396 from msg1: MMS Message 332. WML : DeviceModel 334 sends the transcode to wbmp 398 to the : Media Processor 340 and the rendered message part 400 (image/wbmp) to the : WAP Terminal 210.

Figure 3C:
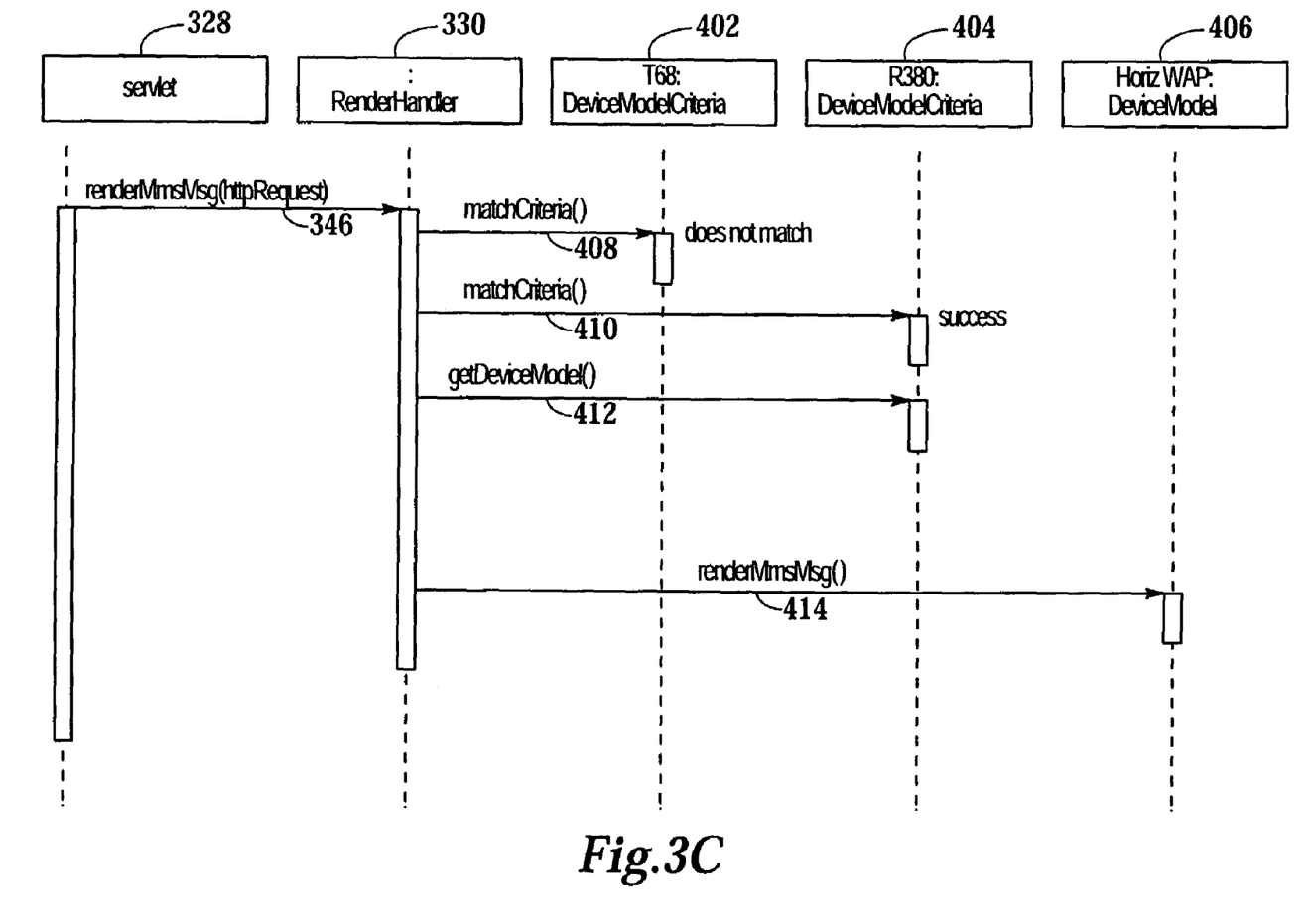
FIG. 3C is a sequence diagram illustrating target device or browser handling and model determination during the rendering sequence of FIG. 3B.

Referring now to FIG. 3C, a sequence diagram illustrating target device or browser handling and model determination during the rendering sequence of FIG. 3B is shown. The servlet 328 sends rendering request 346 (renderMmsMsg (httpRequest)) to the : RenderHandler 330, which will send match requests 408 and 410 (matchCriteria()) to various models, such as T68 : DeviceModelCriteria 402 and R380 : DeviceModelCriteria 404. If a successful match is found as in 410, the RenderHandler 330 gets the model from R380 : DeviceModelCriteria 404 via message 412 (getDeviceModel()). The RenderHandler 330 then sends message 414 (renderMmsMsg()) to Horiz WAP : DeviceModel to render the multimedia message using the model.

Figure 4:
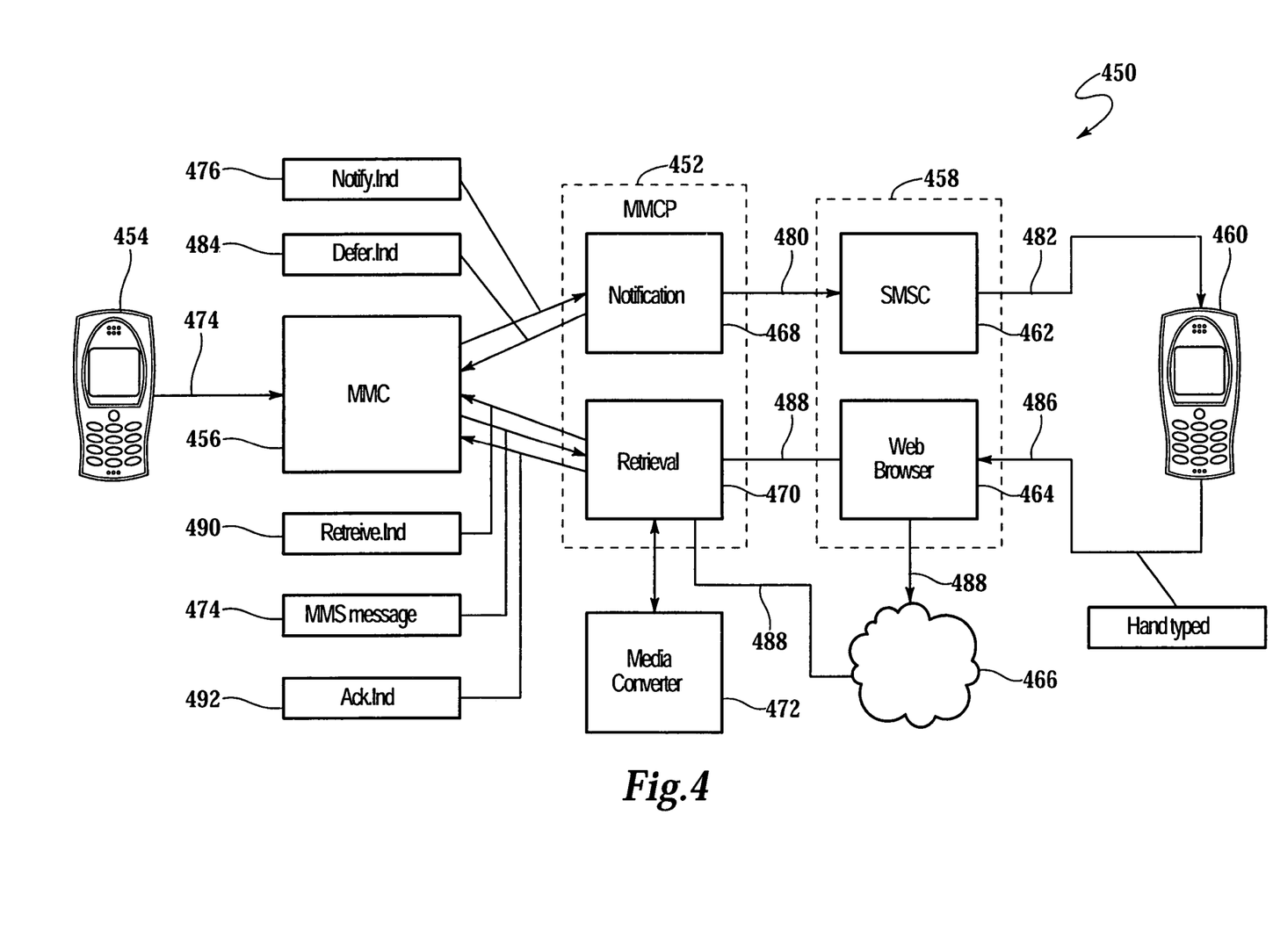
FIG. 4 is a block diagram illustrating a multimedia message processing system using a multimedia client proxy in accordance with another embodiment of the present invention.

Now referring to FIG. 4, a block diagram illustrating a multimedia message processing system 450 using a MMCP 452 in accordance with another embodiment of the present invention is shown. The system 450 includes a sending user's terminal 454, a MMC 456, a MMCP 452, a message gateway 458 and a receiving user's terminal 460. The sending user's terminal 454 is multimedia compatible, whereas the receiving user's terminal 460 is incompatible with multimedia messages, such as a SMS terminal with web access. In addition, the sending and receiving user's terminals 454 and 460 are communicably connected to the MMC 456 and message gateway 458, respectively, via one or more communication networks, such as fixed networks, mobile networks, 2G mobile networks, 3G mobile networks and Internet/IP networks. The message gateway 458 includes a SMSC 462 and a web browser 464, which is communicably connected to network 466. The MMC 456, MMCP 452 and message gateway 458 are communicably connected together via networks that use standard Internet-type protocols, such as HTTP, XML, SMTP and others. The present invention also uses standard mobile telecommunication protocols, such as SMS, MMS and others. The MMCP 452 includes a notification module 468 and a retrieval module 470. The MMCP 452 is also communicably connected to a media converter 472.

In operation, the sending user's terminal 454 sends the multimedia message 474 to the MMC 456 where it is stored pending delivery to the receiving user's terminal 460. The MMC 456 sends a notification 476 (Notify.Ind) to the notification module 468 of the MMCP 452, which in turn sends a notification 480 to the SMSC 462, which sends a notification 482 to the receiving user's terminal 460 indicating that the multimedia message 474 has been received and is ready for delivery. The MMCP 452 also sends a request that the retrieval of the multimedia message be deferred 484 (Defer.Ind) to the MMC 456. When the user wants to receive the multimedia message 474, he or she sends a retrieve message 486 from the receiving user's terminal 460 to the web browser 464, which sends a retrieval request 488 to the retrieval module 470 of the MMCP 452 via network 466. The retrieval module 270 of the MMCP 452 sends a retrieval request 490 (Retrieve.Ind) to the MMC 456, which then sends the multimedia message 474 to the retrieval module 470 of the MMCP 452. The media converter 472 renders the multimedia message 474 into a message that is compatible with the incompatible terminal (receiving user's terminal 460). The rendered message is then sent to the incompatible terminal (receiving user's terminal 460) via the message gateway 258. The retrieval module 270 of the MMCP 452 also sends an acknowledgment 492 (Ack.Ind) back to the MMC 456 indicating that the multimedia message 474 has been received.

Figure 5:
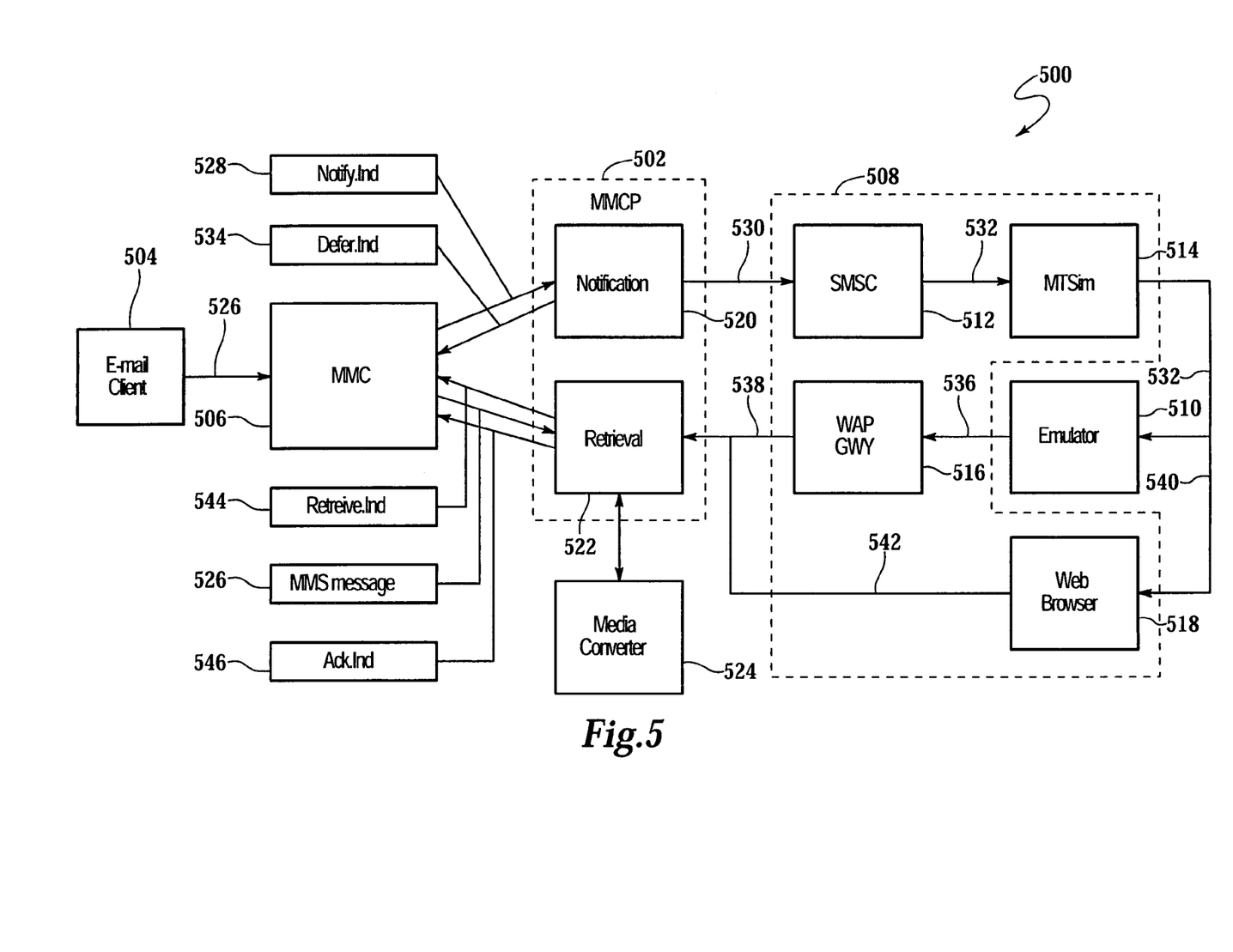
FIG. 5 is a block diagram illustrating a testing system for multimedia message processing using a multimedia client proxy in accordance with one embodiment of the present invention.

Referring to FIG. 5, a block diagram illustrating a testing system 500 for multimedia message processing using a MMCP 502 in accordance with one embodiment of the present invention is shown. The system 500 includes an Email client 504, a MMC 506, a MMCP 502, a message gateway 508 and a device emulator 510. The Email client 504 and device emulator 510 are communicably connected to the MMC 506 and message gateway 508, respectively, via one or more communication networks, such as fixed networks, mobile networks, 2G mobile networks, 3G mobile networks and Internet/IP networks. The message gateway 508 includes a SMSC 512 with MSH Get, a MTSim 514, a WAP gateway 216 and a web browser 518. The MMC 506, MMCP 502 and message gateway 508 are communicably connected together via networks that use standard Internet-type protocols, such as HTTP, XML, SMTP and others. As a result, the message gateway 508 and the device emulator 510 can be configured to model any desirable configuration so that the MMCP 502 can be tested. The present invention also uses standard mobile telecommunication protocols, such as SMS, MMS and others. The MMCP 502 includes a notification module 520 and a retrieval module 522. The MMCP 502 is also communicably connected to a media converter 524.

In operation, the Email client 504 sends the multimedia message 526 to the MMC 506 where it is stored pending delivery to the device emulator 510. The MMC 506 sends a notification 528 (Notify.Ind) to the notification module 520 of the MMCP 502, which in turn sends a notification 530 to the SMSC 512, which sends a notification 532 to the device emulator 510 via the MTSim 514 indicating that the multimedia message 526 has been received and is ready for delivery. The MMCP 502 also sends a request that the retrieval of the multimedia message be deferred 534 (Defer.Ind) to the MMC 506. Depending on the configuration being tested, the device emulator 510 either sends a retrieve message 536 to the WAP gateway 516, which sends a retrieval request 538 to the retrieval module 522 of the MMCP 502; or sends a retrieve message 540 to the web browser 518, which sends a retrieval request 542 to the retrieval module 522 of the MMCP 502. The retrieval module 522 of the MMCP 502 sends a retrieval request 544 (Retrieve.Ind) to the MMC 506, which then sends the multimedia message 526 to the retrieval module 522 of the MMCP 502. The media converter 524 renders the multimedia message 526 into a message that is compatible with the device emulator 510. The rendered message is then sent to the device emulator 510 via the message gateway 508. The retrieval module 522 of the MMCP 506 also sends an acknowledgment 546 (Ack.Ind) back to the MMC 506 indicating that the multimedia message 526 has been received.

All of the methods described above can be implemented using a computer program embodied on a computer readable medium wherein each function is executed using a code segment. The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus for sending a multimedia message from a multimedia service center to a terminal incompatible with multimedia messages, the apparatus comprising:

a notification module that receives a notification from the multimedia service center indicating that the multimedia message is available via a message gateway, sends the notification to the incompatible terminal via a Short Message Service Center (SMSC) and, responsive to the notification module receiving the notification from the multimedia service center indicating that the multimedia message is available, sends a deferral request to the multimedia service center requesting that delivery of the multimedia message be deferred until delivery is requested;

a media converter for transcoding one or more parts of the multimedia message;

a retrieval module communicably coupled to the media converter, said retrieval module:

receiving a retrieval request originated by the incompatible terminal, wherein the retrieval request is received from a communication device selected from a group consisting of a Wireless Application Protocol (WAP) gateway and a Web browser;

requesting delivery of the multimedia message from the multimedia service center in response to the retrieval request from the incompatible terminal;

converting the multimedia message to a converted multimedia message compatible with the incompatible terminal by determining whether the multimedia message requires transcoding and responsive to a determination that the multimedia message requires transcoding, sending the multimedia message to the media converter for transcoding and receiving the transcoded multimedia message from the media converter; and sending the converted multimedia message to the incompatible terminal; and at least one processor for running the notification module, the media converter, and the retrieval module;

wherein the apparatus is adapted to function as a proxy for communications between the multimedia service center and the message gateway such that incompatible messages can be transmitted between incompatible terminals.

2. The apparatus as recited in claim 1, wherein the retrieval module converts the multimedia message to a converted multimedia message by:

obtaining a header from the multimedia message and putting the header in the converted multimedia message;

convening each body part in the multimedia message to a format that is compatible with the incompatible terminal; and putting each converted body part in the converted multimedia message.

3. The apparatus as recited in claim 1, wherein the retrieval module further receives a save request originated by the incompatible terminal, said save request containing an electronic mail address, wherein the retrieval module sends the multimedia message to the electronic mail address.

4. A system for sending a multimedia message to a terminal incompatible with multimedia messages, said system comprising:

a multimedia service center for storing the multimedia message until delivery is requested;

a message gateway for communicating with the incompatible terminal, said message gateway including:

a Short Message Service Center (SMSC); and a communication device selected from a group consisting of a Wireless Application Protocol (WAP) gateway and a Web browser; and a multimedia client proxy communicably coupled to the multimedia service center and the message gateway, wherein the multimedia client proxy:

receives an indication from the multimedia service center that a multimedia message is ready for delivery;

responsive to receiving the indication from the multimedia service center that the multimedia message is available, sends a deferral request to the multimedia service center requesting that delivery of the multimedia message be deferred until delivery is requested;

sends a notification to the incompatible terminal indicating that the multimedia message is available via the message gateway, said notification being sent via the SMSC;

retrieves the multimedia message from the multimedia service center in response to a delivery request from the incompatible terminal via the message gateway;

converts the multimedia message into a message compatible with the incompatible terminal; and delivers the converted multimedia message to the incompatible terminal via the message gateway.

5. The system as recited in claim 4, wherein the multimedia client proxy converts the multimedia message by:

obtaining a header from the multimedia message, and placing the header in the converted multimedia message;

converting each body part in the multimedia message to a format that is compatible with the incompatible terminal; and putting each converted body part in the converted multimedia message.

6. The system as recited in claim 4, wherein the retrieval module further receives a save request originated by the incompatible terminal, said save request containing an electronic mail address, wherein the retrieval module sends the multimedia message to the electronic mail address.

\* \* \* \* \*

UNITED STATES PATENT AND TRADEMARK OFFICE
CERTIFICATE OF CORRECTION

| | |
|---|---|
| PATENT NO. | : 7,200,680 B2 |
| APPLICATION NO. | : 10/095321 |
| DATED | : April 3, 2007 |
| INVENTOR(S) | : Evans et al. |

It is certified that error appears in the above-identified patent and that said Letters Patent is hereby corrected as shown below:

In Column 9, Line 54, in Claim 2, delete "convening" and insert -- converting --, therefor.

Signed and Sealed this

Eighth Day of April, 2008

JON W. DUDAS
*Director of the United States Patent and Trademark Office*